US012482000B2

(12) United States Patent
Sampaio et al.

(10) Patent No.: US 12,482,000 B2
(45) Date of Patent: *Nov. 25, 2025

(54) GENERATION OF DIVERGENCE DISTRIBUTIONS FOR AUTOMATED DATA ANALYSIS

(71) Applicant: Feedzai - Consultadoria e Inovação Tecnológica, S.A., Coimbra (PT)

(72) Inventors: Marco Oliveira Pena Sampaio, Vila Nova de Gaia (PT); Pedro Cardoso Lessa e Silva, Oporto (PT); João Dias Conde Azevedo, Maia (PT); Ricardo Miguel De Oliveira Moreira, Lisbon (PT); João Tiago Barriga Negra Ascensão, Lisbon (PT); Pedro Gustavo Santos Rodrigues Bizarro, Lisbon (PT); Ana Sofia Leal Gomes, Lisbon (PT); João Miguel Forte Oliveirinha, Loures (PT)

(73) Assignee: Feedzai—Consultadoria e Inovação Tecnológica, S.A. (PT)

( * ) Notice: Subject to any disclaimer, the term of this patent is extended or adjusted under 35 U.S.C. 154(b) by 0 days.

This patent is subject to a terminal disclaimer.

(21) Appl. No.: 18/659,309

(22) Filed: May 9, 2024

(65) Prior Publication Data

US 2024/0346510 A1     Oct. 17, 2024

Related U.S. Application Data

(63) Continuation of application No. 17/386,288, filed on Jul. 27, 2021, now Pat. No. 12,020,256.

(Continued)

(30) Foreign Application Priority Data

Jul. 26, 2021  (EP) ..................... 21187800
Jul. 26, 2021  (PT) ........................ 117364

(51) Int. Cl.
  *G06Q 20/40*     (2012.01)
  *H04L 9/40*      (2022.01)

(52) U.S. Cl.
  CPC ............................... *G06Q 20/4016* (2013.01)

(58) Field of Classification Search
  None
  See application file for complete search history.

(56) References Cited

U.S. PATENT DOCUMENTS

2010/0145836 A1   6/2010  Baker
2012/0137367 A1*  5/2012  Dupont ................. G06F 21/00
                                                    726/25

(Continued)

OTHER PUBLICATIONS

A Fraud Detection System Using Machine Learning, IEEE (Year: 2021).*

(Continued)

*Primary Examiner* — Bruce I Ebersman
*Assistant Examiner* — Bhavin D Shah
(74) *Attorney, Agent, or Firm* — Van Pelt, Yi & James LLP

(57) ABSTRACT

A set of data elements is received. For each feature of a set of features, a corresponding reference distribution for the set of data elements is determined. For each feature of the set of features, one or more corresponding subset distributions for one or more subsets sampled from the set of data elements are determined. For each feature of the set of features, the corresponding reference distribution is compared with each of the one or more corresponding subset distributions to determine a corresponding distribution of divergences. At least the determined distributions of divergences for the set of features are provided for use in automated data analysis.

19 Claims, 10 Drawing Sheets

Related U.S. Application Data

(60) Provisional application No. 63/135,314, filed on Jan. 8, 2021.

(56) References Cited

U.S. PATENT DOCUMENTS

| | | | | |
|---|---|---|---|---|
| 2017/0061016 | A1* | 3/2017 | Lytkin | G06Q 30/0201 |
| 2018/0018585 | A1 | 1/2018 | Marin | |
| 2018/0182037 | A1* | 6/2018 | Lange | G06Q 40/06 |
| 2019/0012581 | A1* | 1/2019 | Honkala | G06V 10/758 |
| 2019/0121350 | A1 | 4/2019 | Cella | |
| 2020/0012900 | A1 | 1/2020 | Walters | |
| 2020/0225655 | A1 | 7/2020 | Cella | |
| 2020/0285997 | A1 | 9/2020 | Bhattacharyya | |
| 2020/0364953 | A1 | 11/2020 | Simoudis | |
| 2020/0366699 | A1 | 11/2020 | Sampaio | |
| 2020/0410403 | A1 | 12/2020 | Kamulete | |
| 2021/0125104 | A1* | 4/2021 | Christiansen | G06N 20/10 |
| 2021/0390372 | A1 | 12/2021 | Byrne | |

OTHER PUBLICATIONS

Anti-fraud system on the basis of data mining technologies, IEEE (Year: 2017).*
Aapo Hyvarinen, Independent Component Analysis: Recent Advances, Proc. R. Soc., pp. 1-25, 2011.
Ahmad et al., Real-Time Anomaly Detection for Streaming Analytics, arXiv:1607.02480, Jul. 8, 2016.
Alippi et al., Just-in-Time Adaptice Classifiers—Part I: Detecting Nonstationary Changes, IEEE Transactions on Neural Networks, vol. 19, No. 7, pp. 1145-1153, Jul. 2008.
Anderson et al., A Test of Goodness of Fit, Journal of the American Statistical Association, vol. 49, Issue 268, pp. 765-769, Dec. 1954.
Blazquez-Garcia et al., A Review on Outlier/Anomaly Detection in Time Series Data, ACM, pp. 1-32, 2020.
Cai et al., Distances Between Probability Distributions of Different Dimensions, Mathematics Subject Classification, pp. 1-17, 2020.
Dasu et al., An Information-Theoretic Approach to Detecting Changes in Multi-Dimensional Data Streams, pp. 1-24, 2006.
Ding et al., An Anomaly Detection Approach Based on Isolation Forest Algorithm for Streaming Data Using Sliding Window, 3rd IFAC International Conference on Intelligent Control and Automation Science, pp. 12-17, Sep. 2013.
Ebrahimi et al., Large Multistream Data Analytics for Monitoring and Diagnostics in Manufacturing Systems, pp. 1-32, 2018.
Frank J. Massey Jr., The Kolmogorov-Smirnov Test for Goodness of Fit, Journal of American Statistical Association, 1951, pp. 68-78.
Guha et al., Robust Random Cut Forest Based Anomaly Detection on Streams, Proceedings of the 33rd International Conference on Machine Learning, 2016.
Hyvarinen et al., Nonlinear ICA Using Auxiliary Variables and Generalized Contrastive Learning, Proceedings of the 22nd International Conference on Artificial Intelligence and Statistics, 2019.
Hyvarinen et al., Unsupervised Feature Extraction by Time-Contrastive Learning and Nonlinear ICA, 30th Conference on Neural Information Processing Systems, pp. 1-9, 2016.
Juliet Popper Shaffer, Multiple Hypothesis Testing, Annual Reviews, 1995.
Karl Pearson, On Lines and Planes of Closest Fit to Systems of Points in Space, The London, Edinburgh, and Dublin Philosophical Magazine and Journal of Science, Series 6, pp. 559-572, 2010.
Khemakhem et al., Variational Autoencoders and Nonlinear Ica: A Unifying Framework, Proceedings of the 23rd International Conference on Artificial Intelligence and Statistics, 2020.
Kifer et al., Detecting Change in Data Streams, Proceedings of the 30th VLDB Conference, pp. 180-191, 2004.
Laparra et al., Dimensionality Reduction via Regression in Hyperspectral Imagery, IEEE Journal of Selected Topics in Signal Processing, vol. 9, No. 6, 2015.
Laparra et al., Sequential Principal Curves Analysis, IPL—Universitat De Valencia Technical Report, pp. 1-17, 2015.
Liu et al., Isolation Forest, 2008.
Lu et al., Learning Under Concept Drift: A Review, pp. 1-18, arXiv, Apr. 13, 2020.
Ludmila I. Kuncheva, Change Detection in Streaming Multivariate Data Using Likelihood Detectors, IEEE, vol. 25, No. 5, May 2013.
Mann et al., On a Test of Whether One of Two Random Variables is Stochastically Larger than the Other, Annals of Mathematical Statistics, 1947.
Matthias Scholz, Validation of Nonlinear PCA, Neural Processing Letters, pp. 1-12, 2012.
Menth et al., On Moving Averages, Histograms and Time-Dependent Rates for Online Measurement, ICPE, 2017.
Miolane et al., Learning Weighted Submanifolds with Variational Autoencoders and Riemannian Variational Autoencoders, 2019.
Moshtaghi et al., Online Clustering of Multivariate Time-Series, SIAM, pp. 360-368, 2016.
Nicholas H. Kuiper, Tests Concerning Random Points on a Circle, Mathematical Statistics, pp. 38-47, 1959.
Pham et al., Anomaly Detection in Large-Scale Data Stream Networks, pp. 1-38, 2014.
Plasse et al., Multiple Changepoint Detection in Categorical Data Streams, Statistics and Computing, Feb. 15, 2019.
Qahtan et al., A PCA-Based Change Detection Framework for Multidimensional Data Streams, KIDD, pp. 935-944, 2015.
Ross et al., Nonparametric Monitoring of Data Streams for Changes in Location and Scale, Technometrics, pp. 379-389, Nov. 2011.
Scholz et al., Nonlinear PCA: A New Hierarchical Approach, ESANN, 2002.
Scholz et al., Nonlinear Principal Component Analysis: Neural Network Models and Applications, p. 45-68, 2008.
Song et al., Statistical Change Detection for Multi-Dimensional Data, pp. 1-31, 2006.
Sture Holm, A Simple Sequentially Rejective Multiple Test Procedure, Scandinavian Journal of Statistics, 1979, pp. 65-70, vol. 6, No. 2.
Tan et al., Fast Anomaly Detection for Streaming Data, Proceedings of the 22nd International Joint Conference on Artificial Intelligence, pp. 1511-1516, 2011.
Tomas Pevny, Loda: Lightweight On-line Detector of Anomalies, Machine Learning, pp. 275-304, 2016.
Yang et al., Neighbor-Based Pattern Detection for Windows Over Streaming Data, EDBT, pp. 529-540, 2009.

* cited by examiner

GENERATION OF DIVERGENCE DISTRIBUTIONS FOR AUTOMATED DATA ANALYSIS

CROSS REFERENCE TO OTHER APPLICATIONS

This application is a continuation of U.S. patent application Ser. No. 17/386,288, now U.S. Pat. No. 12,020,256, entitled GENERATION OF DIVERGENCE DISTRIBUTIONS FOR AUTOMATED DATA ANALYSIS filed Jul. 27, 2021, which is incorporated herein by reference for all purposes.

U.S. patent application Ser. No. 17/386,288 claims priority to U.S. Provisional Patent Application No. 63/135,314 entitled AUTOMATED FEATURE MONITORING FOR DATA STREAMS filed Jan. 8, 2021, which is incorporated herein by reference for all purposes.

U.S. patent application Ser. No. 17/386,288 claims priority to Portugal Provisional Patent Application No. 117364 entitled GENERATION OF DIVERGENCE DISTRIBUTIONS FOR AUTOMATED DATA ANALYSIS filed Jul. 26, 2021, which is incorporated herein by reference for all purposes.

U.S. patent application Ser. No. 17/386,288 claims priority to European Patent Application No. 21187800.4 entitled GENERATION OF DIVERGENCE DISTRIBUTIONS FOR AUTOMATED DATA ANALYSIS filed Jul. 26, 2021, which is incorporated herein by reference for all purposes.

BACKGROUND OF THE INVENTION

Data analysis is a process for obtaining raw data and converting it into information useful for informing conclusions or supporting decision-making. Typical data analysis steps include collecting data, organizing data, manipulating data, and summarizing data. Oftentimes, data analysis is performed automatically by computer systems on datasets that are too large and complex for analysis by a human. In many scenarios, a goal of automated data analysis is to determine whether a given collection of data is substantially similar, in a specified and quantifiable sense, to another collection of data. Accomplishing this goal requires determining relevant data patterns and structures that can be compared across datasets, which can be challenging, particularly in the context of automated data analysis of large amounts of data. Thus, it would be beneficial to develop techniques directed toward characterization of data for robust and efficient comparison of large datasets.

BRIEF DESCRIPTION OF THE DRAWINGS

Various embodiments of the invention are disclosed in the following detailed description and the accompanying drawings.

DETAILED DESCRIPTION

Figure 1:
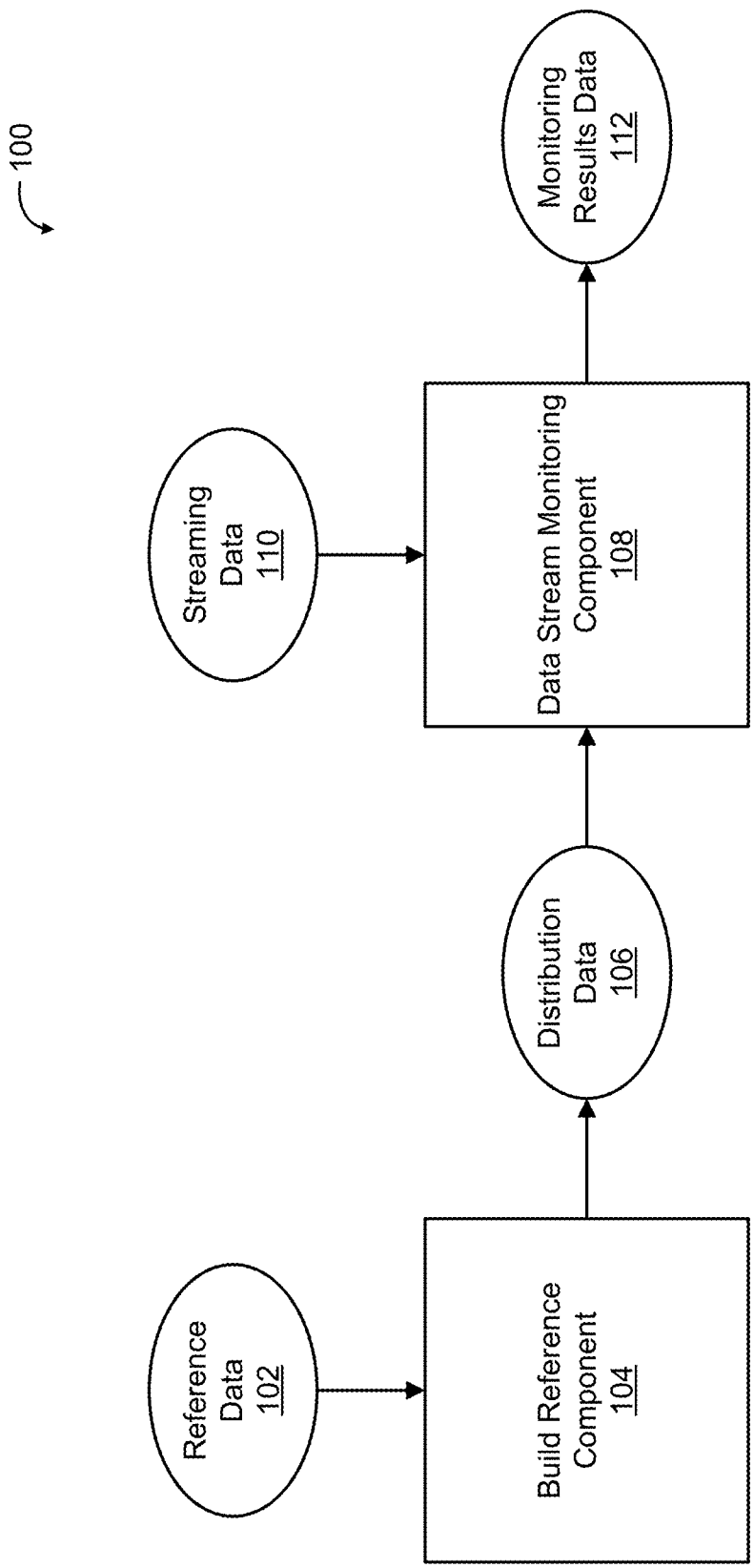
FIG. 1 is a high-level block diagram illustrating an embodiment of a framework for performing feature monitoring.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generation of divergence distributions for automated data analysis is disclosed. A set of data elements is received. For each feature of a set of features, a corresponding reference distribution for the set of data elements is determined. For each feature of the set of features, one or more corresponding subset distributions for one or more subsets sampled from the set of data elements are determined. For each feature of the set of features, the corresponding reference distribution is compared with each of the one or more corresponding subset distributions to determine a corresponding distribution of divergences. At least the determined distributions of divergences for the set of features are provided for use in automated data analysis.

As used herein, a data stream refers to a sequence of digitally encoded coherent signals used to transmit or receive information. A data stream can be comprised of logically separate data elements referred to as events. Stated alternatively, events are distinct data elements (e.g., arriving in the data stream at distinct moments in time) utilized as fundamental units for automated data analysis. Each data element can be comprised of several data items that can be characterized to determine properties (also referred to herein as features) useful for data analysis. Stream processing systems (also referred to as data stream processing systems) are computer systems that analyze data streams. An example of a stream processing system is a fraud detection system that receives information associated with user transactions and determines whether identity theft (e.g., wrongful use of personal information of another) has likely occurred. Many stream processing systems (e.g., fraud detection systems) are real-time stream processing systems. Real-time processing refers to processing that occurs at the time data is generated or published or processing that occurs as frequently as necessary for a particular use case.

The initial configuration of real-time stream processing systems typically assumes that future data flowing through the systems approximately follows the same patterns as previously received data. Real-time stream processing systems typically require reconfiguration over time because even though the systems may initially perform well, over time, due to data drift, a static configuration may result in performance deterioration. Data drift refers to changes in data patterns and/or structure (e.g., a change in the distribution of data) over time. Data drift can occur due to expected or unexpected factors. With respect to fraud detection, an example of expected data drift is seasonal changes in user purchasing patterns, and an example of unexpected data drift is a change in data patterns as a result of technical issues that corrupt or otherwise alter the observed data. Data drift can be gradual or sudden and may occur in specific features of data or collectively for all or almost all the features. Data drift can be a significant problem. For example, machine learning (ML) models responsible for predictive tasks might make inaccurate decisions because of extrapolations from short-sighted training set observations (that do not account for future data pattern changes).

Accurate and timely detection of data drift can allow for measures to be taken to mitigate the negative effects of data drift. This is a challenging task that is made easier in systems where a clear performance target and immediate labels allow performance evaluation in real-time. However, this is rarely the case, and in many domains, such as the detection of fraud, labels cannot be obtained in real-time. Several weeks or even months may pass until labels are available. In this scenario, unsupervised methods are required to detect data drift timely and accelerate corrective action. Furthermore, in many streaming data scenarios, a very large volume of data is generated every day at very high rates. Thus, if real-time monitoring is required, lightweight solutions are needed to avoid high additional computational and storage costs.

Techniques to automate the detection and alarming of data drifts based on monitoring the distribution of data features, referred to herein as feature monitoring, are disclosed herein. Technological advantages (e.g., that improve the functioning of computer systems) of the solutions disclosed herein include lower memory footprint (e.g., by using histograms to summarize the data distributions) and reduced computational cost (e.g., by using estimation methods that support recursive updates, resulting in low real-time latencies). In various embodiments, a multivariate data-driven statistical test using a reference data period is utilized. In various embodiments, histograms are utilized to summarize data distributions (also referred to herein simply as distributions). However, it is not a requirement that data distributions be represented by histograms. Other data distribution representations, such as parameterized functions (functions that have parameters fixed to data), may also be utilized. It is understood that, as used herein, a reference to histograms also contemplates other data distribution representations. Furthermore, several types of histograms are possible. As used herein, data distribution representations may be referred to as distribution representations or simply distributions.

A framework for feature monitoring is disclosed herein. The framework includes a build reference component to build reference distributions for the data features to be monitored as well as a distribution of their reference statistical fluctuations (e.g., measured by a divergence between distributions) based on a reference dataset or portion thereof of the reference dataset. In some embodiments, the framework includes a pre-processing module to extract a set of features to monitor. The features can be original features (identity mapping) or a new set of decorrelated or independent features to be monitored. In various embodiments, for each feature, the build reference component builds a reference distribution from the reference dataset, samples the reference dataset to generate corresponding subsets, builds distributions for the subsets, determines divergences between the subset distributions and the reference distribution, and builds a distribution of the divergences. In some embodiments, the build reference component outputs a triplet of distribution representations per feature, e.g.: 1) a reference histogram built from the reference dataset, 2) a histogram built from a sample of the reference dataset, and 3) a histogram of divergence values.

The framework also includes a data stream monitoring component to process a series of time-ordered events and monitor a set of features against corresponding input reference distributions (e.g., provided by the build reference component). The data stream monitoring component generates alarms (with corresponding reports). In various embodiments, for each feature of a set of features, the data stream monitoring component processes streaming data (e.g., event by event, in batches of events, etc.) to build a target distribution that corresponds to an input reference distribution. In some embodiments, for each feature, the input reference distribution is received by the data stream monitoring component from the build reference component. In various embodiments, for each feature, the data stream monitoring component computes a divergence between the target distribution and the input reference distribution and computes a statistical value (e.g., a p-value). This results in a set of statistical values that can be ranked, scaled, and utilized in a multivariate statistical test with a suitable threshold to identify features for which to raise an alarm. Alarmed features can be mapped to a set of interpretable features, ranked by importance to explain the alarm, and reported (along with other information, such as when the alarm occurred).

Technological advantages of the techniques disclosed herein include: 1) lightweight computing in terms of both computational complexity as well as space complexity by using a constant memory reference state and a constant memory streaming state updated via a recursive technique and 2) computational savings from reduced retraining of models (e.g., machine learning models) by using data drift detection to determine the most suitable time to retrain models and avoiding unnecessary retraining actions.

FIG. 1 is a high-level block diagram illustrating an embodiment of a framework for performing feature monitoring. Framework 100 includes build reference component 104, data stream monitoring component 108, and various data that is received or generated. Framework 100 illustrates data flow associated with build reference component 104 and data stream monitoring component 108. Reference data 102 is received by build reference component 104. Build reference component 104 generates distribution data 106, which is transmitted to data stream monitoring component 108. Data stream monitoring component 108 receives streaming data 110. Based at least in part on distribution data 106 and streaming data 110, data stream monitoring component 108 generates monitoring results data 112.

Framework 100 involves monitoring distributions of features of a dataset in a streaming production environment (feature monitoring). The features that are monitored may comprise several fields (e.g., categorical or numerical), which may be provided directly or derived/calculated using other collected fields for incoming events. Framework 100 does not rely on any assumptions on what the features are used for in the production environment. In some applications, the features are used by a pre-trained ML model for predictive tasks. For example, with respect to credit card (or other) fraud detection, the ML model may be a model that determines whether a transaction (e.g., a transaction made via the Internet) corresponding to an incoming event is legitimate or not.

In various embodiments, build reference component 104 is responsible for producing data-driven references for distributions to be monitored, along with estimates of expected levels of their statistical fluctuations. In the example illustrated, build reference component 104 receives reference data 102, which is a data source with a plurality of events used to define a reference distribution of its data. Reference data 102 may correspond to a fixed period before deployment (e.g., a training period of an ML model for a predictive task). Reference data 102 can also correspond to any past period, including after deployment (e.g., if the feature monitoring framework raises an alarm on a feature that changed permanently, a system administrator may want to refresh reference data 102 with the latest data). In various embodiments, reference data 102 corresponds to an extended period, e.g., several weeks or months of data.

In some embodiments, build reference component 104 performs feature space decorrelation/reduction. In some applications, a set of features may be highly correlated and have strong dependencies. Hence, the effective dimensionality of the monitored feature space may be much smaller. In those scenarios, it may be desirable to work with a different set of features that are less correlated or even independent (e.g., if build reference component 104 results are used in a data stream monitoring component that assumes feature independence). Therefore, in those cases, build reference component 104 may utilize a sub-component to apply a decorrelation or an independent features extraction technique to reduce the dimensionality of the feature space.

In various embodiments, for each feature to be monitored, build reference component 104 produces a representation of a reference distribution of the data of reference data 102 (e.g., encoded in a histogram). In various embodiments, for each feature to be monitored, several reference distributions (e.g., histograms), corresponding to different time windows within the time period spanned by reference data 102, are computed. Stated alternatively, reference data 102 can be sampled. This can be used to characterize the distribution of the data fluctuations in shorter periods within reference data 102. For example, suppose reference data 102 spans six months. In that case, each distribution corresponding to a sample (sampled distribution) can be a distribution of a feature in a one-week, one-month, etc. sub-period. The sub-periods may be sampled randomly. In various embodiments, for each feature, build reference component 104 computes a measure of divergence between each sampled distribution and the corresponding reference distribution, resulting in an output that is used to produce a representation of the distribution of divergence values of the feature (e.g., a histogram of divergence values for the feature). In various embodiments, distribution data 106 includes this representation of the distribution of divergence values for each feature, as well as the corresponding reference distribution representation for each feature. In addition, for each feature, an example sampled distribution representation may be included. A detailed example of build reference component 104 is described with respect to FIGS. 2A-2C.

Framework 100 illustrates data stream monitoring component 108 processing streaming data 110. In various embodiments, this processing occurs in real-time. For each arriving event or arriving batch of events, data stream monitoring component 108 computes new estimates for distributions of monitored feature values. In various embodiments, the new estimates are compared with data received from build reference component 104, in the form of distribution data 106, to determine if a data drift has likely occurred and thus an alarm should be triggered. In various embodiments, distribution data 106 includes a set of distributions (e.g., represented by histograms), one per feature, to serve as an initial state, a corresponding set of reference distributions, and a corresponding set of divergence distributions (e.g., also represented by histograms) to characterize distributions of divergence values for each feature. Specifically, in various embodiments, data stream monitoring component 108 performs the following for each monitored feature: 1) updates a distribution representation taking into account one or more new values, 2) computes a divergence measure between the updated distribution representation and a reference distribution representation, and 3) computes a statistical value (e.g., a p-value) by comparing the computed divergence measure with a reference distribution of divergence values. In various embodiments, data stream monitoring component 108 then performs a multivariate statistical test that combines various statistical values (e.g., p-values) corresponding to different features to determine if the computed set of divergence measures are within expected statistical fluctuations. If the divergence measures exceed an expected level of fluctuations, an alarm is raised. In various embodiments, the alarm includes explanatory information that summarizes information associated with the computed statistical values (e.g., the p-values). The explanatory information may also include ranking of features by importance to explain the alarm, which may involve transformations back to an original feature set if a decorrelation or independent components extraction or feature space dimensionality reduction procedure was applied. In the example illustrated, data stream monitoring component 108 outputs monitoring results 112, which can include the alarm explanatory information. Additional actions can also occur when an alarm is triggered. For example, ML model retraining, build reference component 104 retraining to suppress continuing alarms (e.g., if a permanent drift occurs), threshold adjustments, or system administrator notifications can occur. For efficiency reasons, the computation of divergence values may not occur for every event. In this scenario, feature distribution representations can still be updated for every event of streaming data 110, but the computation of divergences between updated distributions and reference distributions would only occur after a specified number of events have passed. A detailed example of data stream monitoring component 108 is described with respect to FIGS. 3A-3B.

Figure 2A:
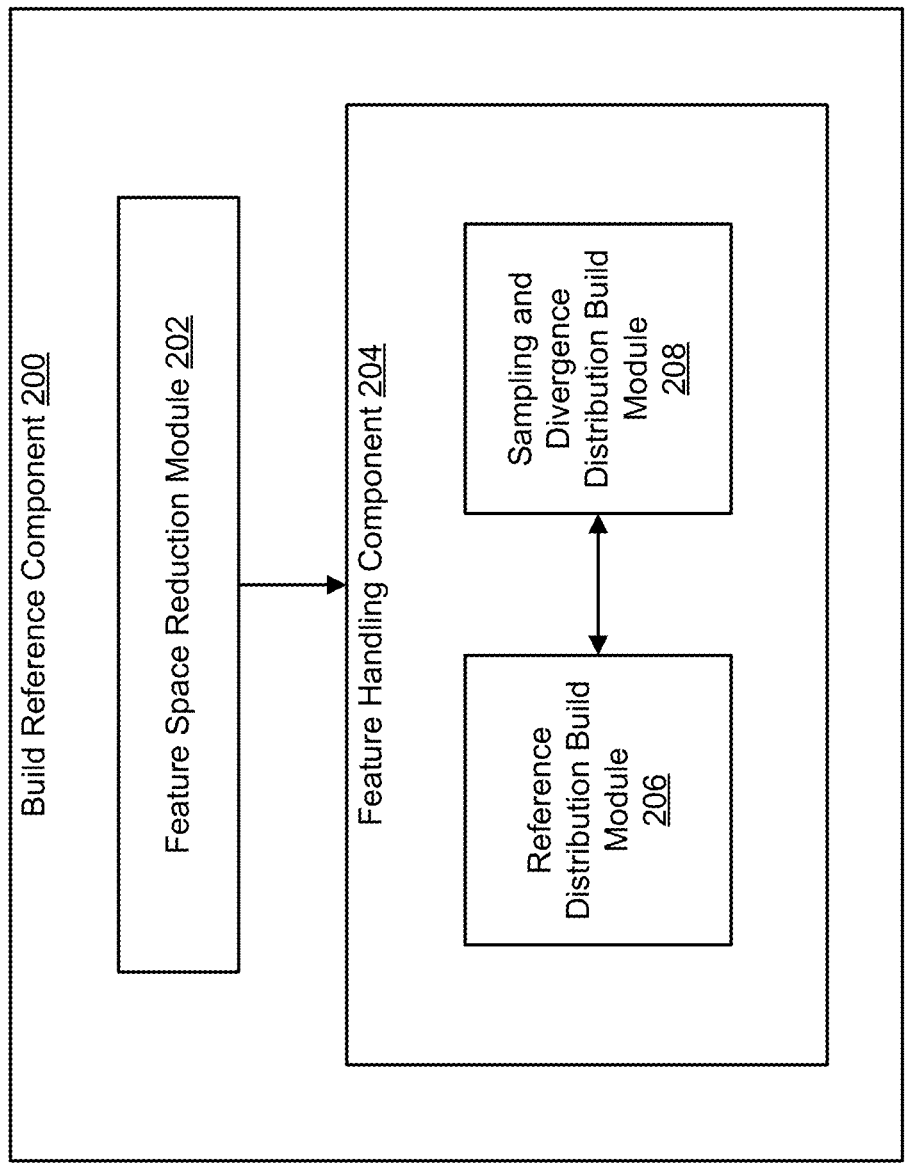
FIG. 2A is a block diagram illustrating an embodiment of a build reference component.
Figure 7:
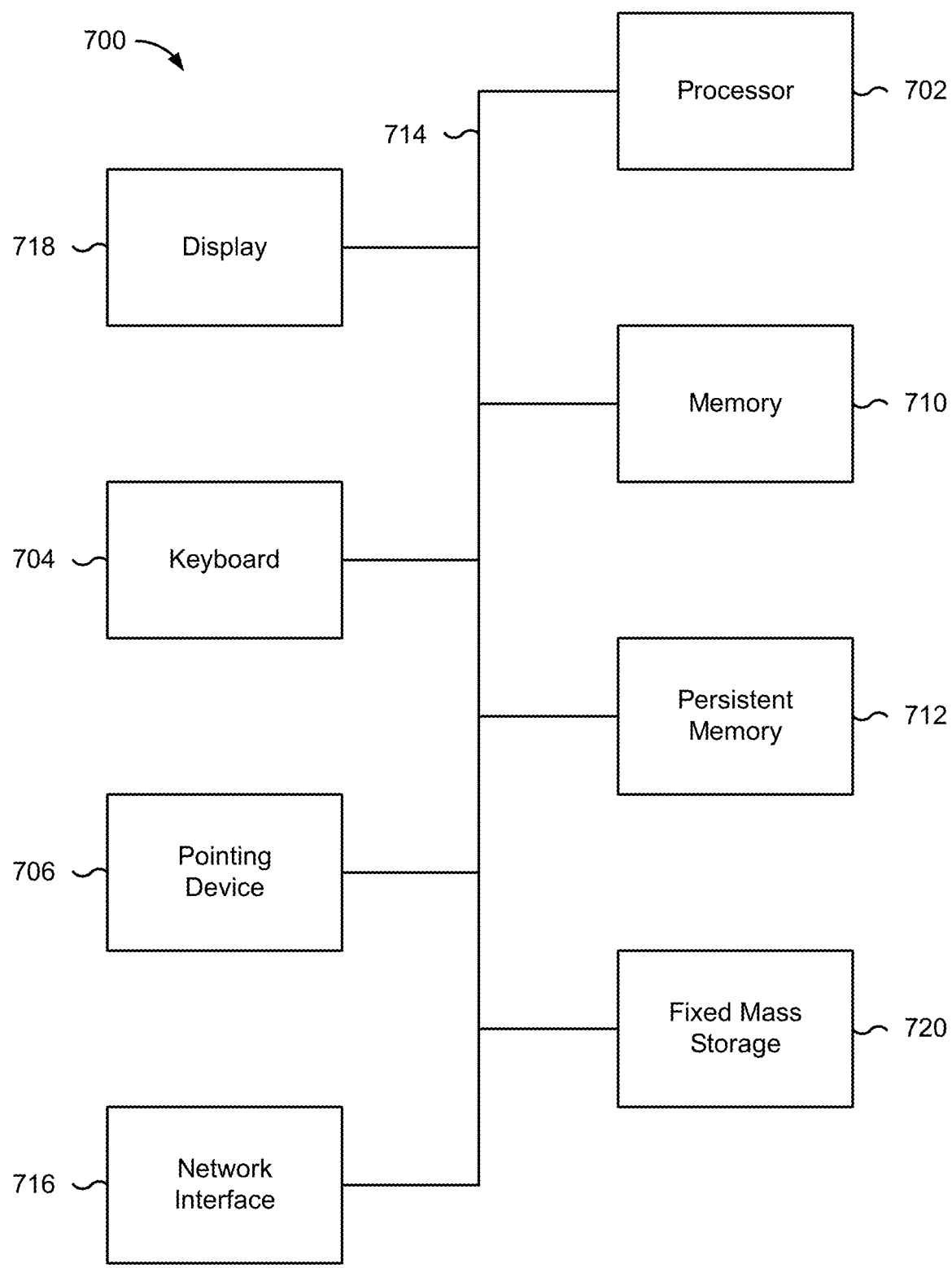
FIG. 7 is a functional diagram illustrating a programmed computer system.

FIG. 2A is a block diagram illustrating an embodiment of a build reference component. In some embodiments, build reference component 200 is build reference component 104 of framework 100 of FIG. 1. In some embodiments, build reference component 200 (including its sub-components) is comprised of computer program instructions that are executed on a general-purpose processor, e.g., a central processing unit (CPU), of a programmed computer system. FIG. 7 illustrates an example of a programmed computer system. It is also possible for the logic of build reference component 200 to be executed on other hardware, e.g., executed using an application-specific integrated circuit (ASIC) or a field programmable gate array (FPGA).

In the example shown, build reference component 200 includes feature space reduction module 202 and feature handling component 204, which is comprised of reference distribution build module 206 and sampling and divergence distribution build module 208. The components and organization shown in FIG. 2A is merely illustrative and not restrictive. Other configurations are also possible. For example, in embodiments without decorrelation or independent components extraction or feature space dimensionality reduction, feature space reduction module 202 is not included. In the example shown, portions of the communication path between the components are shown. Other communication paths may exist, and the example of FIG. 2A has been simplified to illustrate the example clearly. Although single instances of components have been shown to simplify the diagram, additional instances of any of the components shown in FIG. 2A may exist. Components not shown in FIG. 2A may also exist. Build reference component 200 estimates reference distributions for each of a set of features analyzed. In various embodiments, this estimation is based on a fixed data source comprising several events. In some embodiments, the data source is reference data 102 of FIG. 1.

In some embodiments, data is first processed by feature space reduction module 202. Oftentimes, in ML applications, features available to describe underlying statistical processes have strong correlations. Features may originate from separate systems where they are collected or computed from related transformations on a set of raw fields to capture different views of underlying data processes. For example, in fraud detection, three different profile features such as a sum of transaction amounts in the last 5 minutes (feature 1), a number of transactions in the same period (feature 2), and a sum of transaction amounts over 1 minute (feature 3) can encode overlapping information. In this example, the distinction between them is either the type of aggregation (sum vs. count) or the window size (1 minute vs. 5 minutes). All of these three features originate from the same raw field, and thus they are not independent of each other. In applications where the output of build reference component 200 is used for monitoring in a data stream monitoring component (e.g., data stream monitoring component 300 of FIG. 3A), these observations show that monitoring the full set of features may result in entangled signals or redundancies in the alarm information. This may mask subdominant components or introduce additional noise. Furthermore, in the data stream monitoring component, some multivariate tests may assume independence between the various hypotheses being tested to achieve a higher statistical power. This assumption motivates transforming the feature space to a new space of independent components, which may result in reducing the number of components being characterized by build reference component 200. Feature space reduction can be generically defined as a transformation taking as input a set of initial features $X_1, \ldots, X_K$ and mapping them to a set of final features to be monitored $F_1, \ldots, F_N$, with N less than or equal to K. Example options for performing feature space reduction include, but are not limited to, the techniques described below.

Principal component analysis (PCA) reduction may be utilized to perform feature space reduction. Given a set of features, PCA assumes that the data is distributed as a multivariate Gaussian distribution. PCA re-centers and rotates the coordinate axes so that the origin becomes the center of mass of the estimated Gaussian, and the axes become aligned with its covariance matrix, resulting in new features that are linearly uncorrelated. A dimensionality reduction technique of selecting the features that explain most of the variance can be applied. This can be achieved by ranking features by descending variance and selecting the top features that (cumulatively) explain a specified fraction (e.g., 99%) of the total variance. The remaining features can be assumed to be noise and dropped.

Pairwise correlations reduction may also be utilized. With this approach, the first step is to use PCA to estimate the dimensionality of the feature space. PCA is applied to transform from the original features to a set of principal components and to select the highest variance principal components that cumulatively explain a specified fraction of the variance. This provides an estimate of the effective dimensionality of the feature space. If the total explained variance threshold is large (e.g., 99% of explained variance), the remaining principal components to be dropped correspond to very low variance directions in the feature space. Each of these directions often results from pairs of very correlated features, which PCA transforms into a large variance component and a small variance component. Motivated by the latter, the next step comprises an iterative procedure of pairwise correlation reduction on the original features until the target dimensionality indicated by the PCA reduction is attained. Starting with the most correlated pair, one of the features is removed and this continues iteratively for all other possible pairs until a specified number of features remains.

Both PCA and pairwise correlation reduction can be extended to any measure of correlation, linear or non-linear. Spearman correlation measures some types of non-linear bivariate correlations by transforming each feature to a rank value. Thus, by first transforming the features to a space of ranks and applying PCA afterwards, some types of non-linear correlations can be removed. An assumption is made that the rank features are Gaussian distributed. Various non-linear methods can also be used to decorrelate features. Furthermore, approaches such as independent components analysis (ICA) may be used to identify independent signals responsible for generating the data, rendering the independence assumption of the set of components to be monitored more valid.

In various embodiments, once the set of features to analyze is fixed (e.g., after processing by feature space reduction module 202), each feature is handled by feature handling component 204. In the descriptions below with respect to FIGS. 2A-2C (and also FIGS. 3A 3B), in order to illustrate specific examples, histograms are the data distribution representations described in detail as utilized by the various components. This is merely illustrative and not restrictive. Other distribution representations, such as parameterized functions, may also be used. In various embodiments, reference distribution build module 206 builds a histogram $H_{R,f}$ for each feature f=1, ..., N to characterize a training data distribution, $X_T$, in a reference period of the training data (e.g., time period spanned by the training data). The obtained histograms represent distributions in the whole reference period. Various options are possible regarding the data used, such as using all of $X_T$ or randomly sampling from it. As for building the histogram configuration of bins (or, in general, the representation of the distribution), various approaches may be utilized, as long as the configuration obtained for a specific feature f in this step is fixed across all feature f distributions used in build reference and data stream monitoring phases of a single framework/system. This configuration does not need to be the same for all features.

Figure 2B:
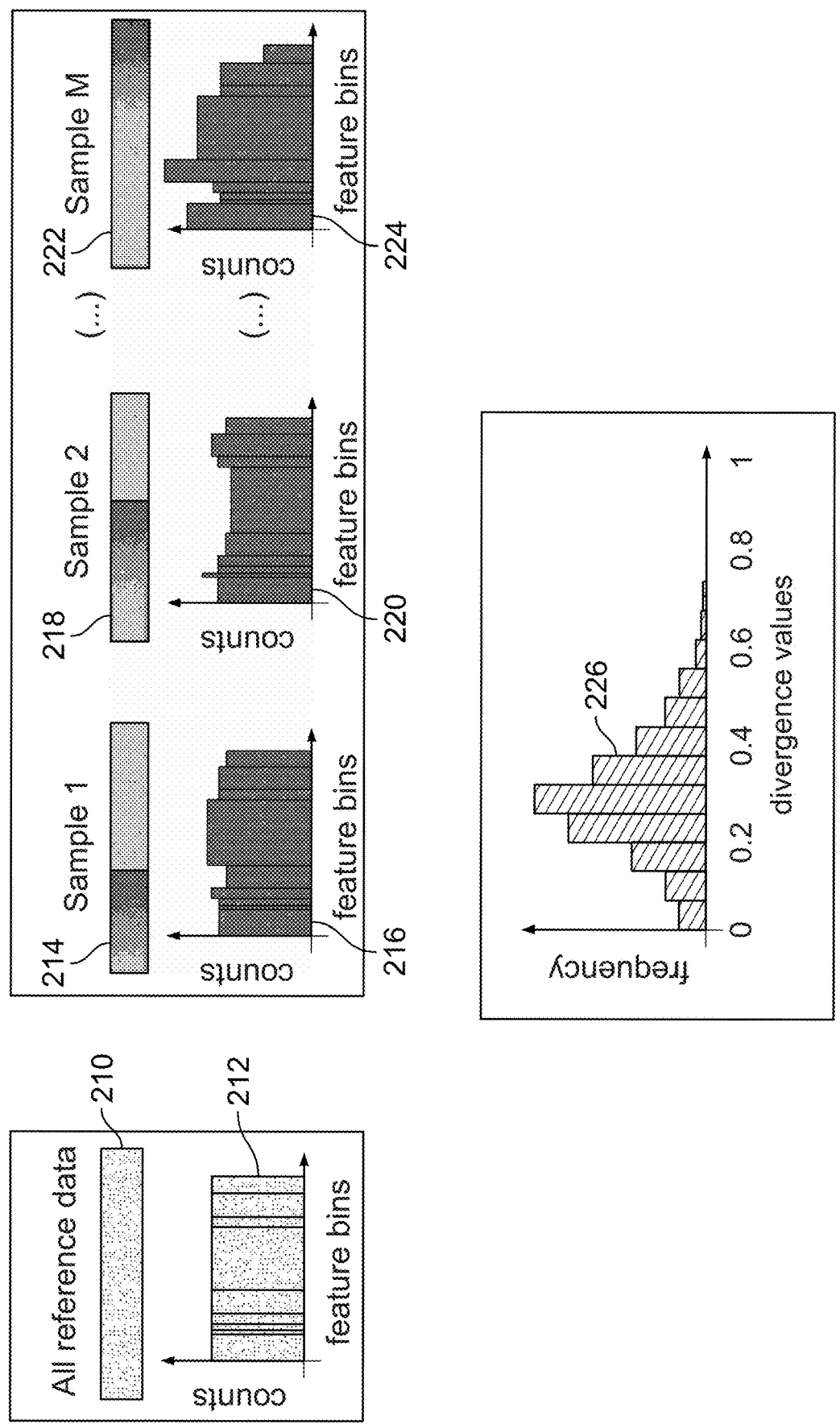
FIG. 2B is a diagram illustrating example data patterns generated by a build reference component.

In some embodiments, only numerical features are included. In other embodiments, both numerical and non-numerical features are utilized. A set of equal height (or equal-frequency) reference histograms $H_{R,f}$ may be built for each feature f. This is illustrated in FIG. 2B as generated reference histogram 212 from all reference data 210. FIG. 2B schematically illustrates data patterns that are relevant on a per feature basis. In the example shown in FIG. 2B, reference histogram 212 is an equal-height histogram (bin widths vary but bin heights do not). Equal-height histograms result in a larger number of bins covering the densest regions of the distribution. An example bin approach is as follows: utilize b+3 bins where b bins are used to cover all existing values in the distribution of the reference data and add 3 additional bins, these additional bins being a leftmost bin covering negative infinity to the first bin of the b bins, a next to rightmost bin covering bin b of the b bins to infinity, and a rightmost bin (NaN bin). The semi-infinite bins cover regions not observed in the reference dataset. In contrast, the NaN bin is necessary for instances with invalid feature values (e.g., an empty value due to a feature collection problem). These three specific additional bins ensure that the histograms always have full support for any possible value.

In various embodiments, sampling and divergence distribution build module 208 performs sampling of reference data for each feature (e.g., sampling of all reference data 210). Sampling is of interest in part because monitoring of feature values during a data stream monitoring phase covers timescales that are usually considerably shorter than the reference period. For example, assume that all reference data 210 corresponds to six months where an ML model was trained. It may be desired to monitor the behavior of each feature in one-week periods after the model is deployed in a streaming environment. Hence, at each time step, it would be desirable to monitor the distribution of the values for each feature in the last week compared to its distribution in the original reference period of six months.

In various embodiments, a measure of divergence to compare two histograms (computation of divergence is described in further detail herein) is utilized. A primary assumption is that the reference period defines the expected data distribution. It is possible to estimate a histogram $H_f$ of a feature f at various time steps within the reference period and compare each estimate with the full reference period $H_{R,f}$. An estimate of the distribution of expected fluctuations of $H_f$ can be a new histogram of divergence values $H_{D,f}$. Samples of all reference data 210 (corresponding to $H_{R,f}$), e.g., at various time steps (corresponding to $H_f$), are illustrated in FIG. 2B as samples 214 (Sample 1), 218 (Sample 2), and 222 (Sample M). Histograms for those samples are illustrated as sample histograms 216, 220, and 224. In FIG. 2B, divergence histogram 226 (corresponding to $H_{D,f}$) shows a distribution of divergence values computed by comparing each sample histogram (including sample histograms 216, 220, and 224) with reference histogram 212. In many datasets, fluctuations of $H_f$ are often associated with seasonal patterns. For example, variability of patterns during a reference period can be particularly prevalent for purchasing behaviors that have a seasonality associated with them (e.g., festivities with gift-exchanges, product launches/promotions, or other daily, weekly, and monthly routines).

The histogram of divergence values $H_{D,f}$ can, in principle, be obtained by computing the divergence of all possible $H_f$ histograms (e.g., for all time steps) within the reference period. However, realistic datasets oftentimes have millions of events per day, requiring computing billions of histograms and their divergences, which becomes very computationally costly. To solve this problem, in various embodiments, random sampling is utilized to obtain a smaller representative number of time steps at which to compute the divergence values.

Data stream monitoring focuses on monitoring extreme events when the divergence values become large (in the higher percentiles of $H_{D,f}$). This means that a good estimate of the upper tails of distributions is needed. In various embodiments, the approach employed is to perform a statistical test under a (multiple) null hypothesis that the divergence values observed for all the features during a data stream monitoring phase follow the same distributions as the corresponding $H_{D,f}$ during a build reference phase. The multiple hypothesis test requires setting a global significance level (or family-wise error rate) for its composite null hypothesis, which corresponds to the p-value of rejecting it due to random fluctuations. However, in multiple hypothesis testing, this typically results in a much stricter significance level being applied to at least some of the individual hypotheses because the probability that at least one of the tests fails by chance grows with the number of tests.

To obtain a conservative upper bound on the critical level for any feature, the Bonferroni correction, which is valid even if the hypotheses are dependent, can be utilized. Therefore, if any of N individual hypotheses (corresponding to N features) fails at a level $\alpha=\overline{\alpha}/N$, then the multiple hypothesis fails at a level $\overline{\alpha}$. In various embodiments, it is desired to ensure that divergence histograms have enough points to estimate the $\alpha$-upper-tail appropriately based on this conservative bound. If the number of samples produced to represent $H_{D,f}$ is M, then the probability $p_0$ that none of those samples falls on the tail (assuming independent samples) is: $p_0=(1-\alpha)^M$ (Equation 1). Furthermore, because N histograms are built, the probability that any histograms are missing samples in the tail of the distribution needs to be limited. The probability $\gamma$ that one or more histograms are missing samples on the tail is related to the probability that none of them are missing samples on the tail: $\gamma=1-(1-p_0)^N=1-(1-(1-\alpha)^M)^N$ (Equation 2). This limits the probability of having one or more "tail"-incomplete histograms. Inverting this formula and replacing a by a indicates that the minimum number of samples is:

$$M = \frac{\log\left[1-(1-\gamma)^{\frac{1}{N}}\right]}{\log\left(1-\frac{\alpha}{N}\right)} \approx \frac{N\log\left(\frac{N}{\gamma}\right)}{\overline{\alpha}}$$

(Equation 3), where $\bar{\alpha} \ll 1$ and $\gamma \ll 1$ are used in the last step. With these numbers, the expected number $\mu$ of samples and its standard deviation $\sigma$ in the tail region (the $\alpha$-tail) can be estimated using the binomial distribution: $\mu = \alpha \times M$ and $\sigma = \sqrt{\mu(1-\alpha)}$. Thus, for example, with a family-wise error rate of $\alpha = 0.01$, $N = 100$ features and $\gamma = 0.01$, the result is $9.2 \pm 3.0$ samples in the tail region of each histogram.

Sampling time steps when the sampled period is considerably smaller than the full reference period should capture well the fluctuations due to the time variability of the process and its statistical variability. However, in a scenario where the sampled/monitored timescale is comparable or even equal to the reference period, there will be few or only one possible sample. In that case, despite being impossible to estimate the fluctuations related to time variability, it is still possible to estimate the expected statistical variability in the histograms by making bootstrap samples of the reference data to evaluate the expected distribution of divergences. In principle, this procedure can be combined with the sampling of time steps, also when the monitored timescale is short, to obtain an estimate of the distribution of divergences that better accounts for the expected statistical fluctuations in the reference data itself. When there is substantial seasonality, the main source of variability should be temporal, so sampling time steps is focused on herein.

In various embodiments, moving histograms are utilized. The computation of a moving histogram $H_f$ to estimate the distribution of a feature in a given period may be performed in various ways. A sliding window (e.g., one week) may be used and the histogram may be computed using all the window events. However, during a data stream monitoring phase, this requires keeping track and storing all the events in the window, which can be computationally costly, especially for long windows and/or use cases with considerable event rates. A solution to this problem is to utilize a technique to estimate the distribution of features using either an Unbiased Exponential Moving Histogram (UEMH) or its time-based version—an Unbiased Time-Exponential Moving Histogram (UTEMH).

For a UEMH, an Unbiased Exponential Moving Average (UEMA) count is kept for each bin of a histogram. When a new instance arrives in the stream, UEMH uses a suppression factor to discount all histogram bin counters and then finds the bin associated with the new instance and increments its value by 1. The bin intervals are defined independently from the UEMH. A UEMA is a modification of an Exponential Moving Average (EMA) to correct for a bias towards the first value of the stream. An EMA makes use of a weighting method that discounts the previous event relative to the current one, always using the same suppression factor. Therefore, the EMA aggregations can be calculated as geometric progressions, which are recursive by definition. The EMA is calculated at each step considering only the current data instance value arriving at the stream and the aggregation value at the previous step. Therefore, EMAs do not require storing any events, only the current value of the aggregations. UEMAs have the same computational complexity advantages as the original EMAs. UTEMHs are similar to UEMHs but use a time-based discount factor instead, similar to Unbiased Time-Exponential Moving Averages (UTEMAs). A UTEMA is a version of EMAs in which instead of considering constant suppression steps between events, the time differences between instances are used to increase (longer time steps) or decrease (shorter time steps) the suppression factor. This approach is particularly suited for irregularly spaced time-series.

For UEMH and UTEMH, no events need to be stored, only the estimated histogram itself at each time step. The histogram is updated on each incoming event via a recursion formula. Thus, the time and memory complexities of this method are O(nb) with n being the number of features and b the number of histogram bins. Since these two quantities are constant and small, the complexity of the update operation is constant both in time and memory with respect to the number of events contributing to the histogram. With this approach, all past events contribute to the histogram $H_f$, but with an exponentially decaying weight (older events are, in effect, forgotten). A half-life parameter controls the timescale corresponding to the histogram. For example, if the goal is to monitor a timescale of about one-week, a half-life corresponding to a few days would be appropriate to suppress events beyond a week. In various embodiments, matching format (same parameters) UEMHs or UTEMHs are used in build reference and data stream monitoring phases.

In various embodiments, sampling and divergence distribution build module 208 computes a representation of the distribution of divergence values $H_{D,f}$ for each feature by computing a divergence between the reference histogram $H_{R,f}$ and each sample $H_f$ for each feature. Each divergence value contributes to a given bin of $H_{D,f}$. The particular binning strategy for $H_{D,f}$ is not critical but should have enough resolution (enough bins) in the tail spanning from $\bar{\alpha}$ to $\alpha$ to be able to estimate the most extreme percentiles reliably to determine the corresponding p-value of observing such a divergence. If the number of samples M is not very large, the simplest option is to save all divergence values for maximal resolution. Various types of divergence measures may be utilized to compare pairs of histograms and the divergence measure need not be the same for all features. Examples of divergence measures include Kolmogorov-Smirnov, Kuiper, and Anderson-Darling test statistics, various information theory divergences such as Kullback-Leibler (KL) divergence and Jensen-Shannon divergence (JSD), and Wasserstein distances.

Figure 2C:
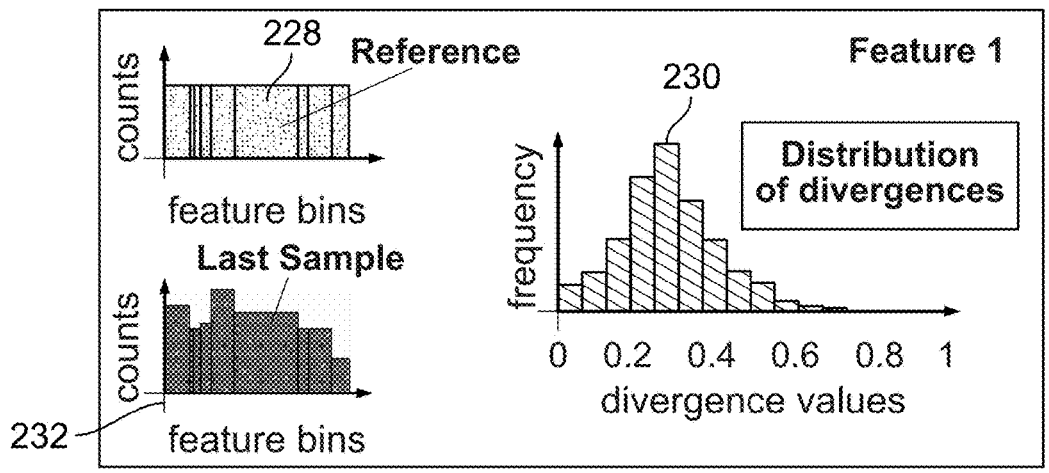
FIG. 2C is a diagram illustrating example data outputs of a build reference component.
Figure 2C:
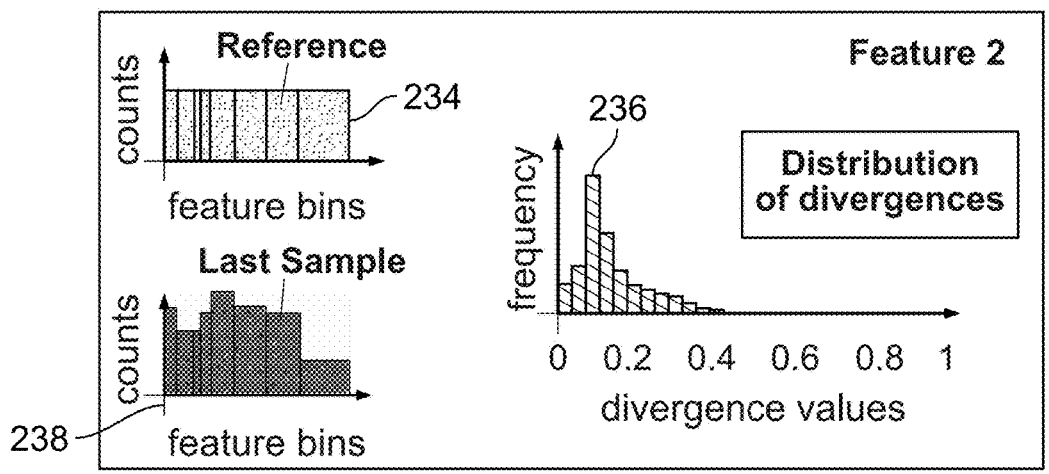
Figure 2C:
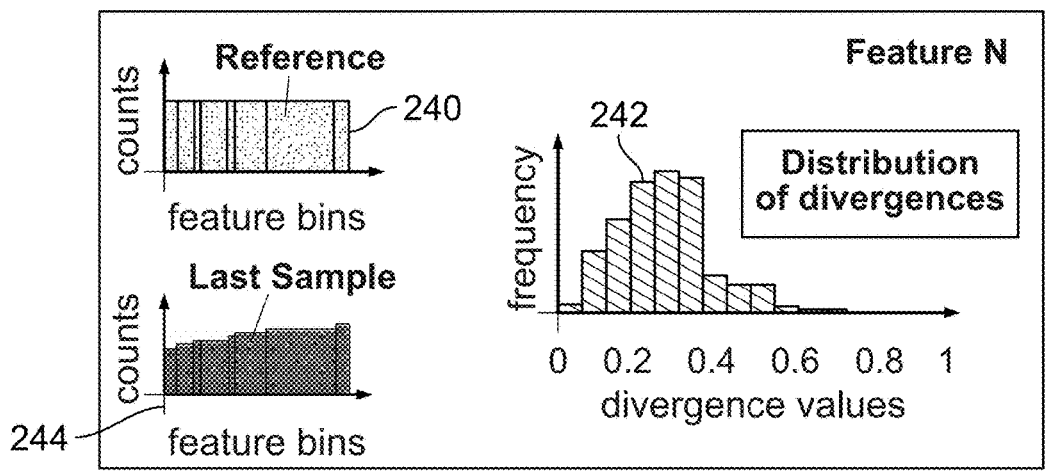

In various embodiments, for each feature, build reference component 200 outputs a final state that can be used by a data stream monitoring component. In some embodiments, this final state is included in distribution data 106 of FIG. 1. An example output of build reference component 200 is illustrated schematically in FIG. 2C. In FIG. 2C, for each feature f in the diagram (features 1, 2, . . . . N), outputs include a reference histogram $H_{R,f}$, a histogram of divergence values $H_{D,f}$, and an initial configuration for $H_f$. For feature 1 in FIG. 2C, these are reference histogram 228, divergence histogram 230, and sample histogram 232, respectively. For feature 2 in FIG. 2C, these are reference histogram 234, divergence histogram 236, and sample histogram 238, respectively. For feature N in FIG. 2C, these are reference histogram 240, divergence histogram 242, and sample histogram 244, respectively. In some embodiments, each sample histogram is the last sample (e.g., last time step) sampled from the reference data. The sample histogram is typically chosen such that the data stream monitoring component starts in a configuration that represents the reference period to avoid artificial alarms in the first iterations while processing the first events in the data stream monitoring phase.

A build reference component that outputs data to be provided to a corresponding data stream monitoring component is described in substantial detail herein. It is also possible to use the build reference component for other purposes. For example, the build reference component may be utilized to select features that have less divergence. The build reference component may also be utilized to summarize a representation of state. The build reference component provides a representation of some properties of a data distribution in a reference period (e.g., a pattern of fluctuations observed in a distribution). This can be viewed as a set of meta-features describing a dataset that can be used as an input to a meta-machine learning process. An example of a meta-machine learning task is to predict the accuracy of a model for a given period based on meta-features that represent the dataset.

The build reference component can be utilized to automatically compare various types of datasets (e.g., by computing divergence between datasets), which is useful in many applications. Many trained machine learning models are oftentimes applied to new datasets on which the machine learning models have not been trained. To ensure that the machine learning models can perform accurately on the new datasets, oftentimes, time-consuming manual labeling of new data is performed to evaluate the ML models that have been trained on a dataset, on new datasets. Using the build reference component to compare the datasets eliminates or reduces the need for manual labeling of data. Thus, the build reference component can be useful for any application for which determining that one large dataset is similar to another is beneficial.

FIG. 2B is a diagram illustrating example data patterns generated by a build reference component. FIG. 2B is described above with respect to FIG. 2A.

FIG. 2C is a diagram illustrating example data outputs of a build reference component. FIG. 2C is described above with respect to FIG. 2A.

Figure 3A:
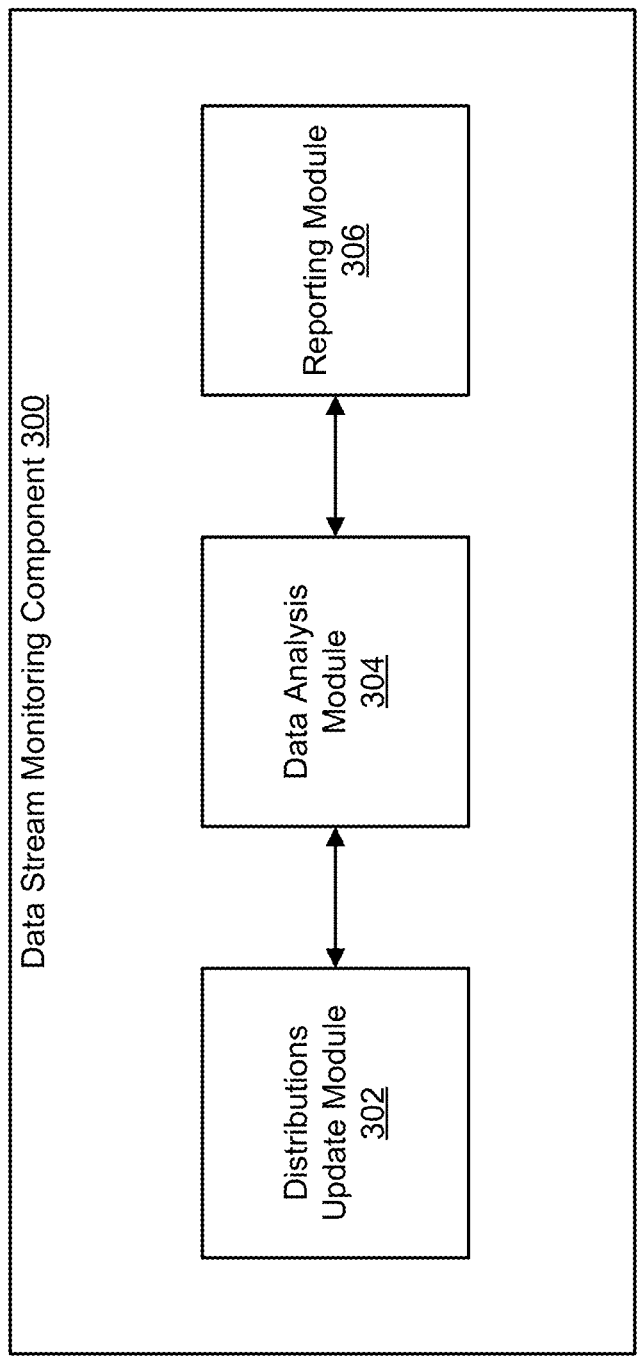
FIG. 3A is a block diagram illustrating an embodiment of a data stream monitoring component.

FIG. 3A is a block diagram illustrating an embodiment of a data stream monitoring component. In some embodiments, data stream monitoring component 300 is data stream monitoring component 108 of framework 100 of FIG. 1. In some embodiments, data stream monitoring component 300 (including its sub-components) is comprised of computer program instructions that are executed on a general-purpose processor, e.g., a CPU, of a programmed computer system. FIG. 7 illustrates an example of a programmed computer system. It is also possible for the logic of data stream monitoring component 300 to be executed on other hardware, e.g., executed using an ASIC or an FPGA.

In the example shown, data stream monitoring component 300 includes distributions update module 302, data analysis module 304, and reporting module 306. The components and organization shown in FIG. 3A is merely illustrative and not restrictive. Other configurations are also possible. In the example shown, portions of the communication path between the components are shown. Other communication paths may exist, and the example of FIG. 3A has been simplified to illustrate the example clearly. Although single instances of components have been shown to simplify the diagram, additional instances of any of the components shown in FIG. 3A may exist. Components not shown in FIG. 3A may also exist.

Data stream monitoring component 300 continuously or continually monitors features. The monitoring is done on an ordered set of data instances that is processed in a streaming fashion (e.g., a streaming system collecting data in real time), producing different outputs as a result. These outputs can include alarms (e.g., to be handled by system administrators), automated actions (e.g., model retraining, rule threshold adjustment, explanation computation), and/or signal visualizations. In many real-time applications, the monitoring runs over an unbounded stream of data. Stated alternatively, the streaming computation is intended to run indefinitely. Data stream monitoring component 300 receives streaming data (e.g., streaming data 110 of FIG. 1). In some embodiments, data stream monitoring component 300 processes each incoming event, wherein an event is a set of data fields, one by one. It is also possible for data stream monitoring component 300 to process events in batches. In various embodiments, each event that is processed comprises a subset of fields that is equivalent to a subset of fields needed by a build reference component to build reference data representations of the features to be monitored. In various embodiments, the output of a previous build reference computation provides the input to data stream monitoring component 300. In various embodiments, the input to data stream monitoring component 300 includes, for each feature to be monitored, a reference histogram $H_{R,f}$ and a divergence histogram $H_{D,f}$. In some embodiments, another input is a configuration parameter specifying frequency (time or event based) at which hypothesis testing (to raise an alarm) occurs.

In various embodiments, for each feature, distributions update module 302 updates a target histogram using a same update method that is used to build sample histograms by a build reference component. In some embodiments, the target histogram is initialized to be a received sample histogram generated and outputted by the build reference component. For EMA based histograms, when the latest event arrives, all bin counts in the target histogram are suppressed by a common factor. This factor can be a constant. It can also be an exponential of the time difference since the last event. This suppression mechanism can be viewed as a soft expiration mechanism for older events, whose contribution is progressively reduced towards zero (instead of a hard expiration, e.g., in a sliding window). The bin corresponding to the feature value for the incoming event is identified and its count is increased by one. This is illustrated schematically in FIG. 3B as bin increment 310 of target histogram 312 for feature 1, bin increment 314 of target histogram 316 for feature 2, and bin increment 318 of target histogram 320 for feature N. The histogram update operation can be a computationally demanding component, particularly when it is performed for each event. In various embodiments, UEMH and UTEMH techniques (as described above) are utilized to reduce the time and space complexity of histogram updates to a constant factor that depends only on the number of features under monitoring and the number of histogram bins used. In addition, the computational demands can be reduced by performing batch processing of events.

Figure 3B:
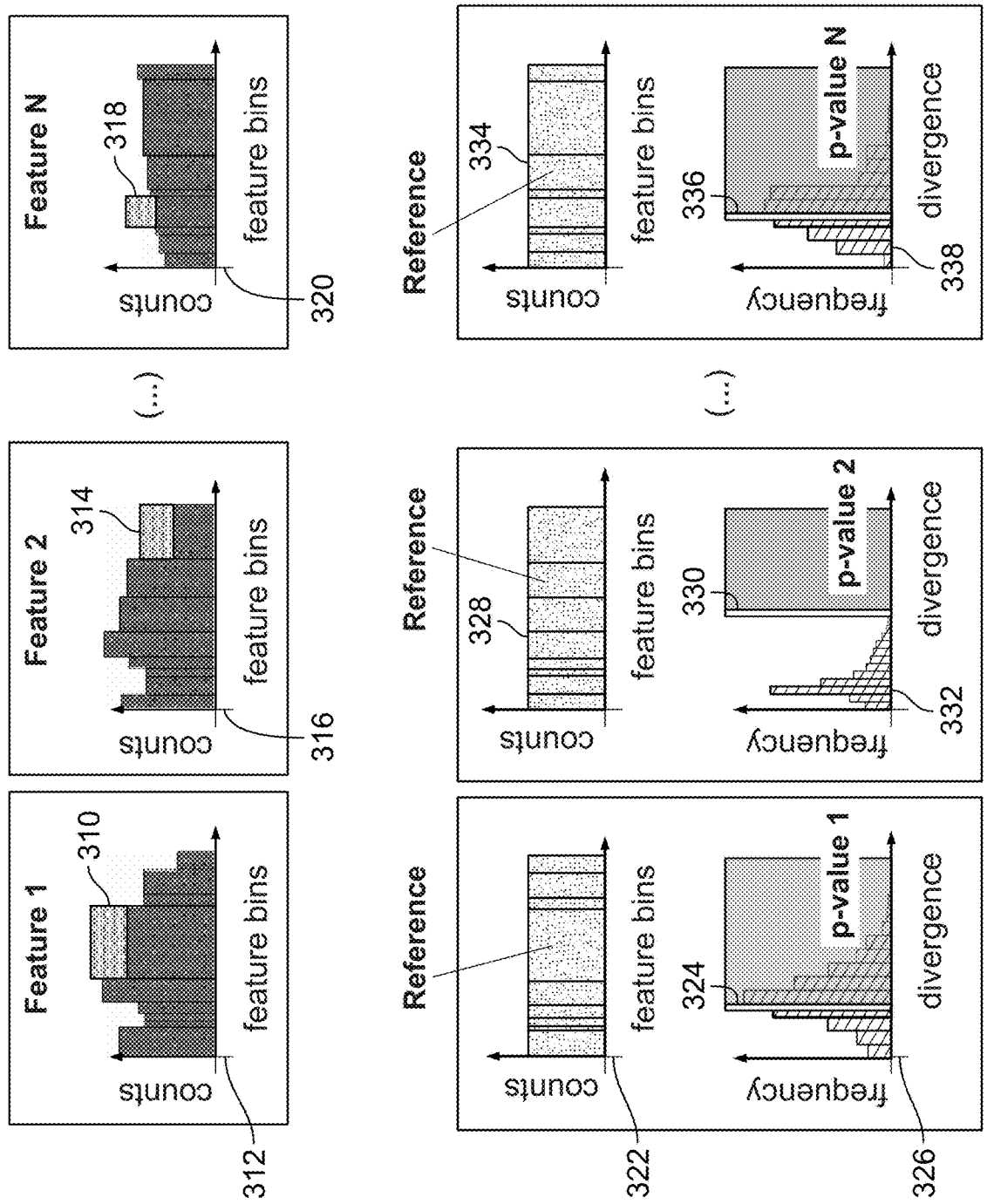
FIG. 3B is a diagram illustrating examples of data analysis associated with a data stream monitoring component.

In various embodiments, for each feature, data analysis module 304 performs data analysis on an updated target histogram using a corresponding reference histogram and divergence histogram. This analysis does not need to occur for every incoming event. Rather, it may be performed for every batch of events. In various embodiments, a divergence between a current target histogram $H_f$ and a corresponding reference histogram $H_{R,f}$ is computed. This value is then located within a corresponding divergence histogram $H_{D,f}$. This is illustrated in FIG. 3B for feature 1, feature 2, and feature N. For feature 1, the divergence between target histogram 312 and reference histogram 322 is computed, and the computed divergence value 324 is located on divergence histogram 326. For feature 2, the divergence between target histogram 316 and reference histogram 328 is computed, and the computed divergence value 330 is located on divergence histogram 332. For feature N, the divergence between target histogram 320 and reference histogram 334 is computed, and the computed divergence value 336 is located on divergence histogram 338. As shown in FIG. 3B, the location where the computed divergence value lies on the corresponding divergence histogram varies. For feature 1, computed divergence value 324 lies in the middle of divergence histogram 326, indicating computed divergence value 324 is not an outlier in divergence histogram 326. In contrast, for feature 2, computed divergence value 330 lies at the right hand tail end of divergence histogram 332, indicating computed divergence value 330 is an outlier in divergence histogram 332. In various embodiments, for each feature, data analysis module 304 also computes a statistical value for each computed divergence value to characterize whether the computed divergence value is significantly larger than typically observed divergence values (e.g., larger than divergence values determined during a build reference phase). In some embodiments, the statistical value computed is a p-value. In some embodiments, the p-value is computed by estimating a corresponding cumulative distribution function (CDF) value and subtracting it from 1. Each of these p-values is schematically represented in FIG. 3B as the area under the histogram to the right of each computed divergence value.

In various embodiments, for each feature, the data analysis module applies a multivariate hypothesis test after statistical values (e.g., p-values) are computed. In the example shown in FIG. 3B, p-value 1, p-value 2, . . . , and p-value N would be the inputs to the multivariate hypothesis test. Stated alternatively, a statistical test that aggregates and/or transforms the individual p-values is applied. The aggregation may include, for example, re-ordering and scaling of the p-values to correct for the fact that the probability of observing a large statistical fluctuation in one of the p-values grows with the number of p-values tested. In some embodiments, a Holm-Bonferroni correction is applied, but other tests are possible (e.g., Hochberg, Hommel, and Rom multiple testing procedures). In some embodiments, the p-values are first ordered by ascending value $p_1, \ldots, p_N$. Each p-value $p_i$ is associated with a feature $f_i$. Then each p-value $p_i$ can be scaled to produce a signal $s_i$ defined as $s_i = p_i \times (N+1-i)$, with $i=1, \ldots, N$ (Equation 4). The null hypothesis is rejected if, for any (or several) of the features $f_i$, $s_i < \alpha$, and an alarm is then raised. For this test, a serves as the threshold.

In various embodiments, in response to an alarm being raised, reporting module 306 outputs an alarm explanation to transmit to a user. In some embodiments, the alarm explanation is included in monitoring results data 112 of FIG. 1. The alarm explanation indicates why an alarm has been raised and may help the user to quickly identify a root cause of a data drift. In various embodiments, the alarm explanation is conveyed in an alarm report and is critical for user investigation. The alarm report is also of interest to a user that is interested in regularly examining the state of data stream monitoring, regardless of any recent alarm.

An element of the multivariate test that can be used to explain the alarm is the set of signals, one per feature, and their respective ranking. This ranking automatically provides a measure of each feature's importance to explain the fluctuation (explain which features deviate the most from their reference distribution). In the particular case of the Holm-Bonferroni test, this ranking already considers that several features are tested simultaneously.

Although the signals produced directly from the monitored features may, in some cases, directly correspond to interpretable features, in the case where an initial transformation has been applied, e.g., to decorrelate features or to remove spurious ones, the same may not hold. For example, suppose a feature such as transaction amount is responsible for the alarm. In that case, this means that its distribution is unusual, warranting investigation. However, consider an alarm in a derived feature such as 0.3×amount+0.7×"number of transactions per credit card in the last hour", or in a component of a non-linear transformation of the original features using a neural network. In that case, it is not clear what happened or what the next steps in an investigation should be. In this case, transforming the signals to the original interpretable space of features via a linear or non-linear transformation is desirable. For example, if the decorrelation transformation was performed via PCA, the squared entries of the rows of an inverse projection matrix $r^2_{xf}$ (used to reconstruct the feature set x from the monitored features f) may be used to assign a weight to each of the features of the original feature set x through a weighted sum $$w_x = \frac{\sum_i r^2_{xf_i} s_i}{\sum_i r^2_{xf_i}}$$

(Equation 5). Other strategies of this type could be applied in the case of non-linear transformations. For example, a matrix of correlations (linear or non-linear correlations) could be computed between the interpretable features and the monitored features and then a similar procedure as in Equation 5 can be applied. After weights for interpretable features are obtained, interpretable features may be sorted by ascending weight value. This sorting provides a measure of feature importance for the alarm.

In various embodiments, reporting module 306 of data stream monitoring component 300 outputs a report of the alarm whenever one is produced and the report is appended to a list of historical alarms. A notification may be sent to one or more users, including complete information on when the alarm occurred, which features alarmed, the state of the computed signals, and the weights of the interpretable features. In various embodiments, even in the absence of an alarm, the information on the signals computed and the features' ranking and weights is saved by data stream monitoring component 300 for continuous system monitoring. In various embodiments, after the alarm is reported, data stream monitoring component 300 waits for a next event or group of events to process.

FIG. 3B is a diagram illustrating examples of data analysis associated with a data stream monitoring component. FIG. 3B is described above with respect to FIG. 3A.

Figure 4:
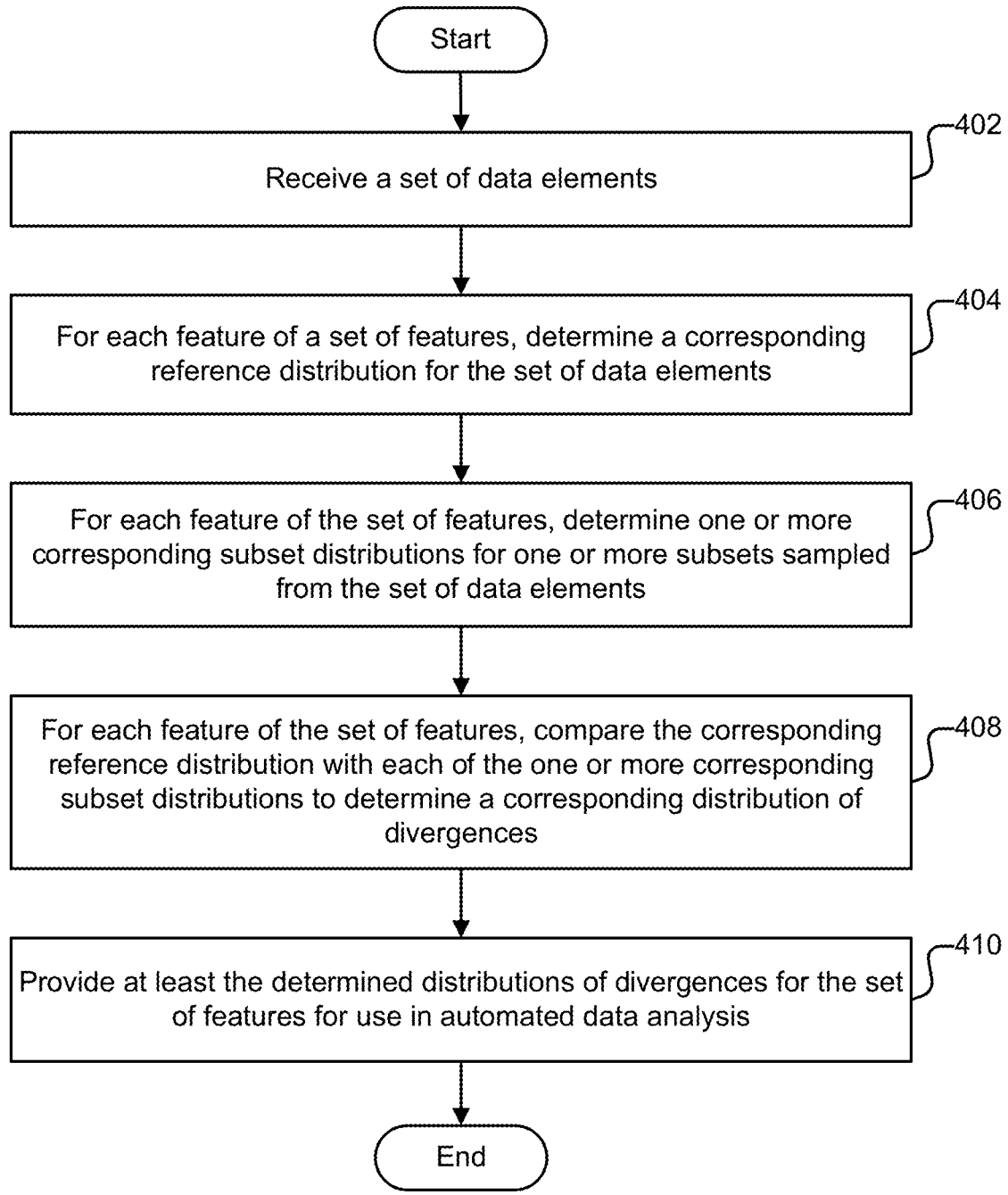
FIG. 4 is a flow diagram illustrating an embodiment of a process for generating divergence distributions for automated data analysis.

FIG. 4 is a flow diagram illustrating an embodiment of a process for generating divergence distributions for automated data analysis. In some embodiments, the process of FIG. 4 is performed by build reference component 104 of framework 100 of FIG. 1 and/or build reference component 200 of FIG. 2A.

At 402, a set of data elements is received. In some embodiments, the set of data elements is included in reference data 102 of FIG. 1. In various embodiments, the data elements correspond to logically separate events, such as events, from a data stream, that occur at distinct moments in time. In various embodiments, each data element is comprised of sub-elements or items of data that correspond to features that are utilized to characterize that data element. An example of a data element is transaction information associated with a single purchase by a particular user. The transaction information can be comprised of various data items, such as transaction amount, transaction time and date, transaction history of the user, etc. In various embodiments, the data elements are collected from many users, oftentimes geographically spread across the world.

At 404, for each feature of a set of features, a corresponding reference distribution is determined for the set of data elements. With respect to the example of fraud detection, examples of features include amount of a purchase, time and date of the purchase, location of the purchase, purchaser identity, number of purchases made by the purchaser within a specified recent period of time, total amount of purchases made by the purchaser within the specified period of time, etc. As the above examples illustrate, features may be numerical features or non-numerical. Some features may be derived from other features. Values associated with each numerical feature vary and have a distribution. In some embodiments, this distribution, the reference distribution, is represented by a histogram (e.g., reference histogram 212 of FIG. 2B), though other distribution representations (e.g., parameterized functions) are also possible.

At 406, for each feature of the set of features, one or more corresponding subset distributions are determined for one or more subsets sampled from the set of data elements. In some embodiments, the subsets sampled correspond to specified time steps within a reference time period associated with the set of data elements. For example, the reference time period for the set of data elements may be 3 months, 6 months, etc. Stated alternatively, all of the reference data may come from a time period of 3 months, 6 months, etc. The subsets may correspond to data from the set of data elements for each one-week sub-period within the 3-month, 6-month, etc. reference time period. Data values from each subset also have a distribution (similar to the reference distribution). In some embodiments, subset distributions are represented as histograms (e.g., sample histograms 216, 220, and 224 of FIG. 2B).

At 408, for each feature of the set of features, the corresponding reference distribution is compared with each of the one or more corresponding subset distributions to determine a corresponding distribution of divergences. In various embodiments, a divergence measure between the reference distribution and each subset distribution is computed. For example, a Jensen-Shannon divergence may be computed between a histogram representing the reference distribution and another histogram representing a subset distribution. This divergence quantitatively characterizes how different the two distributions are. Computing divergence measures between the reference distribution and each subset distribution results in multiple divergence values that themselves vary (according to a distribution). In some embodiments, this distribution of the divergence values is represented as a histogram (e.g., divergence histogram 226 of FIG. 2B).

At 410, at least the determined distributions of divergences for the set of features are provided for use in automated data analysis. In some embodiments, the reference distributions are also provided. In some embodiments, for each feature, at least one subset distribution is also provided (e.g., corresponding to a most recent time step sample). In various embodiments, the various distributions are provided as histograms. In some embodiments, the distributions are included in distribution data 106 of FIG. 1 and provided to data stream monitoring component 108 of FIG. 1.

Figure 5:
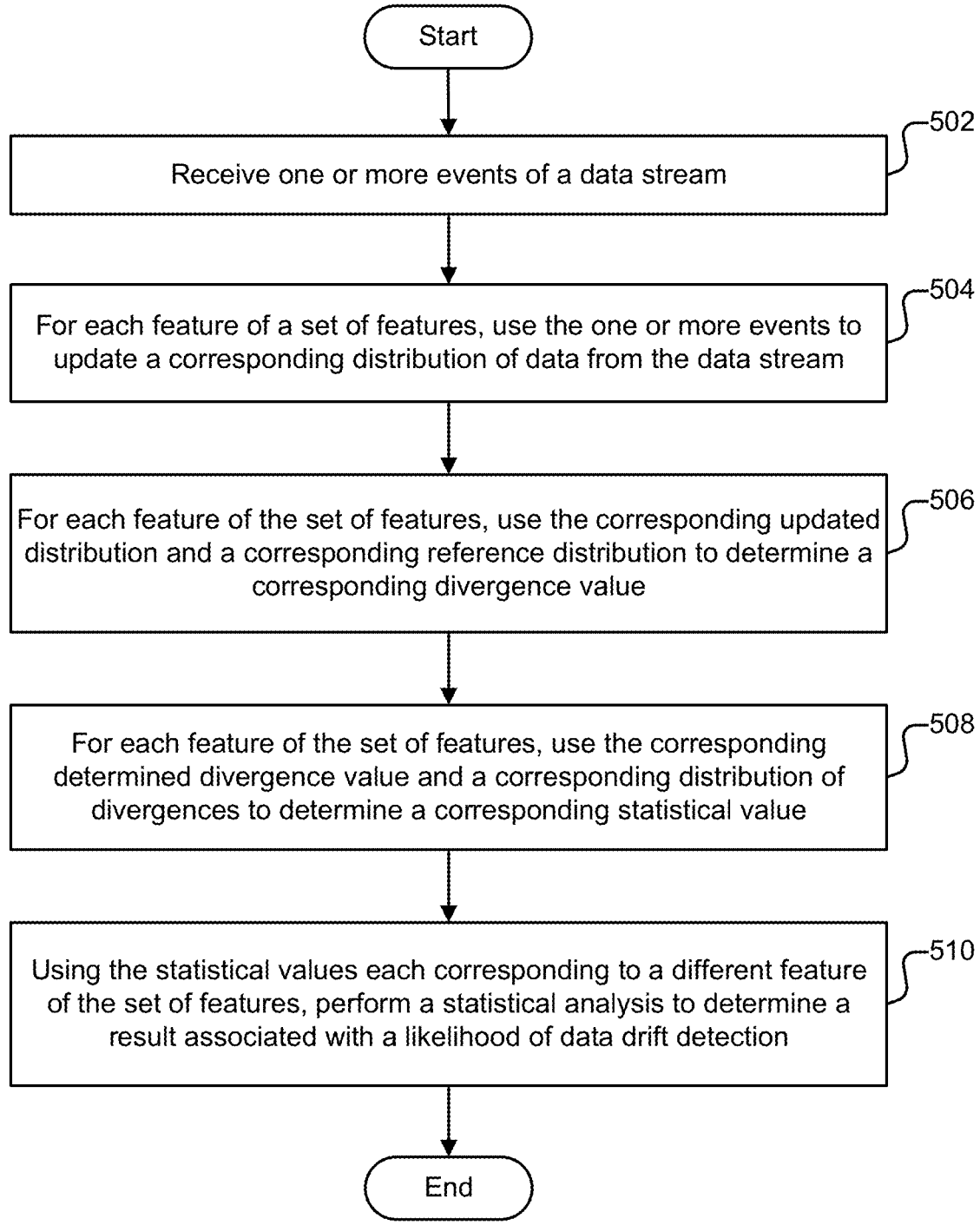
FIG. 5 is a flow diagram illustrating an embodiment of a process for performing automated feature monitoring of a data stream.

FIG. 5 is a flow diagram illustrating an embodiment of a process for performing automated feature monitoring of a data stream. In some embodiments, the process of FIG. 5 is performed by data stream monitoring component 108 of framework 100 of FIG. 1 and/or data stream monitoring component 300 of FIG. 3A.

At 502, one or more events in a data stream are received. In some embodiments, the data stream is comprised of streaming data 110 of FIG. 1. The one or more events may be processed one by one (event by event) or in groups of events (batch processing). With respect to the example of fraud detection, each event may correspond to a purchase transaction by a user. In various embodiments, each event comprises various data items corresponding to features associated with the event. With respect to the example of fraud detection, examples of features include amount of a purchase, time and date of the purchase, location of the purchase, purchaser identity, number of purchases made by the purchaser within a specified recent period of time, total amount of purchases made by the purchaser within the specified period of time, etc. As the above examples illustrate, features may be numerical or non-numerical. Some features may be derived from other features.

At 504, for each feature of a set of features, the one or more events are used to update a corresponding distribution of data from the data stream. For event-by-event processing, updating occurs after each event is received. For batch processing, updating occurs after multiple events have been received. In some embodiments, the distribution of data is represented as a histogram (e.g., target histograms 312, 316, and 320 of FIG. 3B corresponding to different features). Updating of the histogram can be performed by incrementing bins of the histogram. For example, for a histogram of amount purchase values, histogram bins may be arranged in a specified manner to cover purchases from zero dollars to infinity dollars. If a first event is associated with a purchase amount of $100, a histogram bin including $100 would be incremented. Then, if a second event is associated with a purchase amount of $1000, most likely another histogram bin would be incremented (unless a bin covers a range that includes both $100 and $1000). In various embodiments, as more and more events of the data stream are processed, older events are expired. As used herein, expiration refers to deemphasizing or eliminating contributions. For example, events older than one week, two weeks, etc. may be completely eliminated from the histogram (e.g., using a sliding window technique) so that their corresponding data values are not counted in any of the bins of the histogram. Thus, in some scenarios, only a subset of the data stream affects the updated distribution of data.

Older events may also be deemphasized (e.g., by applying a scaling factor less than one) so that their corresponding data values are not given as much weight in the counts of the histogram. In some embodiments, a UEMH or similar type of histogram is utilized. With the UEMH, a UEMA count is kept for each bin of the histogram. The UEMA, similar to an EMA, makes use of a weighting method that discounts the previous event relative to the current one, using the same suppression factor. Therefore, the UEMA (and similar recursive measures) can be calculated as geometric progressions and can be calculated at each step considering only the current data instance value arriving at the data stream and the aggregation value at the previous step. Therefore, UEMA (and similar recursive measures) do not require storing any events, only the current value of the aggregations and consequently have computational complexity advantages (e.g., lower memory usage).

At 506, for each feature of the set of features, the corresponding updated distribution and a corresponding reference distribution are used to determine a corresponding divergence value. In some embodiments, the updated distribution and the reference distribution are represented as histograms. In some embodiments, the reference distribution is received from build reference component 104 of framework 100 of FIG. 1 and/or build reference component 200 of FIG. 2A. Examples of reference distribution histograms include reference histograms 322, 328, and 334 of FIG. 3B. In various embodiments, the reference distribution is derived from a larger dataset than what is used to generate the updated distribution. For example, the reference distribution may be derived from 6 months of training data, whereas the updated distribution depends only on a week, two weeks, etc. of data. The divergence value is a measure of how similar the updated distribution is to the reference distribution. In some embodiments, the divergence value is a Jensen-Shannon divergence. Various other types of divergence measures, e.g., Kolmogorov-Smirnov, Kuiper, and Anderson-Darling test statistics, Kullback-Leibler divergence, and Wasserstein distances, may also be used.

At 508, for each feature of the set of features, the corresponding determined divergence value and a corresponding distribution of divergences are used to determine a corresponding statistical value. In some embodiments, the statistical value is a p-value. In some embodiments, the distribution of divergences is represented as a histogram (e.g., divergence histograms 326, 332, and 338 of FIG. 3B). In some embodiments, the distribution of divergences is received from build reference component 104 of framework 100 of FIG. 1 and/or build reference component 200 of FIG. 2A. In some embodiments, determining the statistical value includes determining a p-value by estimating a corresponding cumulative distribution function value and subtracting it from 1. The p-value is a measure of how much of an outlier the determined divergence value is in the distribution of divergences.

At 510, using the statistical values each corresponding to a different feature of the set of features, a statistical analysis is performed to determine a result associated with a likelihood of data drift detection. In some embodiments, the statistical analysis includes performing a multivariate hypothesis test that aggregates and/or transforms the statistical values (e.g., the p-values). The aggregation may include, for example, re-ordering and scaling of p-values to correct for the fact that the probability of observing a large statistical fluctuation in one of the p-values grows with the number of p-values tested. In some embodiments, a Holm-Bonferroni correction is applied, but other tests are possible (e.g., Hochberg, Hommel, and Rom multiple testing procedures). In various embodiments, the statistical analysis outputs a groupwise error rate value, which if in excess of a specified threshold (e.g., 0.05, 0.01, etc.) triggers an alarm because being in excess of the threshold indicates a threshold likelihood of data drift (e.g., an abnormal divergence between the updated distribution and the reference distribution) that warrants an alarm/report being made.

Figure 6:
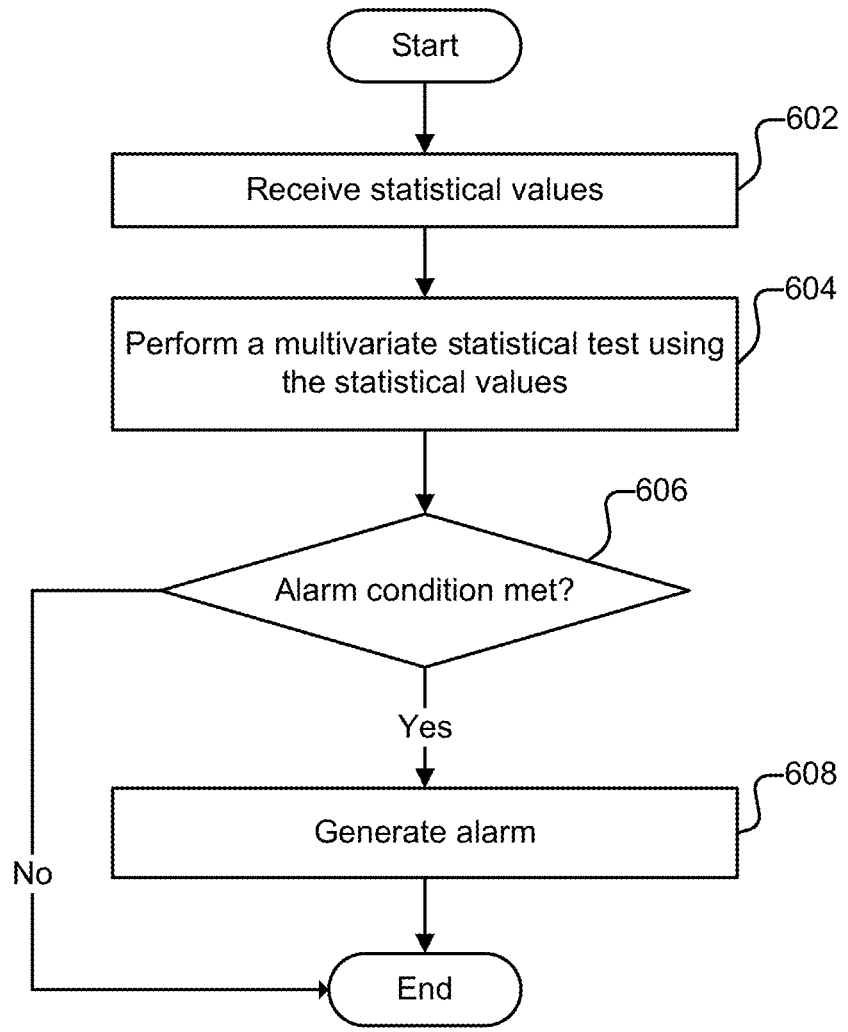
FIG. 6 is a flow diagram illustrating an embodiment of a process for performing statistical analysis to determine whether to generate an alarm associated with feature monitoring.

FIG. 6 is a flow diagram illustrating an embodiment of a process for performing statistical analysis to determine whether to generate an alarm associated with feature monitoring. In some embodiments, the process of FIG. 6 is performed by data stream monitoring component 108 of framework 100 of FIG. 1 and/or data stream monitoring component 300 of FIG. 3A. In some embodiments, at least a portion of the process of FIG. 6 is performed in 510 of FIG. 5.

At 602, statistical values are received. In some embodiments, each statistical value is a p-value associated with a divergence of a distribution with respect to a reference distribution. In various embodiments, each statistical value is associated with a specific feature in a set of features derived from data of a data stream.

At 604, a multivariate statistical test is performed using the statistical values. In various embodiments, the multivariate statistical test includes a correction, such as a Holm-Bonferroni correction, to account for how many statistical values are used in the multivariate statistical test. In various embodiments, the multivariate statistical test outputs a single numerical value.

At 606, it is determined whether an alarm condition has been met. In various embodiments, the alarm condition is met if the numerical value output of the multivariate statistical test is below a specified threshold. In various embodiments, this is indicative of a higher than specified threshold likelihood that data from the data stream diverge (e.g., are not sufficiently similar) to reference data. This is a cause for alarm in many applications (e.g., when an ML model is being utilized on data from the data stream but was trained on the reference data and the ML model may not operate adequately when the data from the data stream and the reference data are not sufficiently similar).

If at 606 it is determined that the alarm condition has not been met, no further action is taken. If at 606 it is determined that the alarm condition has been met, at 608, an alarm is generated. In some embodiments, information associated with the generated alarm is included in monitoring results data 112 of FIG. 1. In various embodiments, the generated alarm includes an alarm explanation that indicates why an alarm was raised and may help a user to quickly identify a cause of data drift.

FIG. 7 is a functional diagram illustrating a programmed computer system. In some embodiments, processes associated with build reference component 104 of framework 100 of FIG. 1, build reference component 200 of FIG. 2A, data stream monitoring component 108 of framework 100 of FIG. 1, and/or data stream monitoring component 300 of FIG. 3A are executed by computer system 700.

In the example shown, computer system 700 includes various subsystems as described below. Computer system 700 includes at least one microprocessor subsystem (also referred to as a processor or a central processing unit (CPU)) 702. For example, processor 702 can be implemented by a single-chip processor or by multiple processors. In some embodiments, processor 702 is a general-purpose digital processor that controls the operation of computer system 700. Using instructions retrieved from memory 710, processor 702 controls the reception and manipulation of input data, and the output and display of data on output devices (e.g., display 718).

Processor 702 is coupled bi-directionally with memory 710, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also, as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

Persistent memory 712 (e.g., a removable mass storage device) provides additional data storage capacity for computer system 700, and is coupled either bi-directionally (read/write) or uni-directionally (read only) to processor 702. For example, persistent memory 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of fixed mass storage 720 is a hard disk drive. Persistent memory 712 and fixed mass storage 720 generally store additional programming instructions, data, and the like that typically are not in active use by the processor 702. It will be appreciated that the information retained within persistent memory 712 and fixed mass storages 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, pointing device 706 can be a mouse, stylus, track ball, or tablet, and is useful for interacting with a graphical user interface.

Network interface 716 allows processor 702 to be coupled to another computer, computer network, or telecommunications network using a network connection as shown. For example, through network interface 716, processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect computer system 700 to an external network and transfer data according to standard protocols. Processes can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, by a processor, a set of data elements, wherein the set of data elements includes a stream of events;
   for each feature of a set of features, determining, by the processor, a corresponding reference distribution of the respective feature using the set of data elements, wherein the corresponding reference distribution characterizes a distribution of training data in a reference time period of the training data;
   updating a histogram representing the corresponding reference distribution, wherein the update is constant in both time and memory with respect to a number of events in the stream of events contributing to the corresponding reference distribution;
   for each feature of the set of features, determining, by the processor, one or more corresponding subset distributions for one or more subsets sampled from the set of data elements;
   for each feature of the set of features, comparing, by the processor, the corresponding reference distribution with each of the one or more corresponding subset distributions to determine a corresponding distribution of divergences including by computing a divergence measure for each comparison of the corresponding reference distribution with the one or more corresponding subset distributions, wherein the divergence measure indicates a degree of difference between the corresponding reference distribution with the one or more corresponding subset distributions;
   optimizing a memory usage and a computational cost associated with a retraining of a machine learning model including by determining an optimal time for the retraining of the machine learning model based on the degree of difference, wherein one or more features of the set of features are utilized by the machine learning model for predictive tasks; and
   providing, by the processor, at least the determined distributions of divergences for the set of features associated with detection of unusual transactions for use in automated data analysis.

2. The method of claim 1, wherein at least a portion of the data elements of the set of data elements correspond to events that occurred at distinct points in time.

3. The method of claim 1, wherein the data elements of the set of data elements correspond to information associated with transactions being analyzed to detect fraud.

4. The method of claim 1, wherein the set of features has been derived from an original set of features at least in part by decorrelating the original set of features.

5. The method of claim 4, further comprising applying independent components extraction to the original set of features.

6. The method of claim 1, wherein one or more features of the set of features are associated with a numerical measurement of data of the set of data elements.

7. The method of claim 1, wherein determining the corresponding reference distribution for the set of data elements includes assigning each data element of the set of data elements to a category among a plurality of categories and counting numbers of data elements in categories of the plurality of categories.

8. The method of claim 1, wherein the one or more subsets sampled from the set of data elements correspond to a plurality of time periods, wherein at least one time period is shorter than a reference time period spanned by all of the data elements of the set of data elements.

9. The method of claim 1, wherein each distribution of the one or more corresponding subset distributions is represented as a histogram.

10. The method of claim 9, wherein the histogram is generated including by applying an exponential moving average suppression of older data elements of the set of data elements to emphasize a time period that is included in a time period associated with the corresponding reference distribution.

11. The method of claim 1, wherein at least a portion of the computed divergence measures is a Jensen-Shannon divergence.

12. The method of claim 1, wherein at least a portion of the computed divergence measures is a Wasserstein distance.

13. The method of claim 1, further comprising providing the corresponding reference distributions for each feature of the set of features.

14. The method of claim 1, further comprising providing, for each feature of the set of features, at least one determined subset distribution.

15. A system, comprising one or more processors configured to:
  receive a set of data elements, wherein the set of data elements includes a stream of events;
  for each feature of a set of features, determine a corresponding reference distribution of the respective feature using the set of data elements, wherein the corresponding reference distribution characterizes a distribution of training data in a reference time period of the training data;
  update a histogram representing the corresponding reference distribution, wherein the update is constant in both time and memory with respect to a number of events in the stream of events contributing to the corresponding reference distribution;
  for each feature of the set of features, determine one or more corresponding subset distributions for one or more subsets sampled from the set of data elements;
  for each feature of the set of features, compare the corresponding reference distribution with each of the one or more corresponding subset distributions to determine a corresponding distribution of divergences including by computing a divergence measure for each comparison of the corresponding reference distribution with the one or more corresponding subset distributions, wherein the divergence measure indicates a degree of difference between the corresponding reference distribution with the one or more corresponding subset distributions;
  optimize a memory usage and a computational cost associated with a retraining of a machine learning model including by determining an optimal time for the retraining of the machine learning model based on the degree of difference, wherein one or more features of the set of features are utilized by the machine learning model for predictive tasks; and
  provide at least the determined distributions of divergences for the set of features associated with detection of unusual transactions for use in automated data analysis.

16. The system of claim 15, wherein at least a portion of the data elements of the set of data elements correspond to events that occurred at distinct points in time.

17. The system of claim 15, wherein the data elements of the set of data elements correspond to information associated with transactions being analyzed to detect fraud.

18. The system of claim 15, wherein the set of features has been derived from an original set of features at least in part by decorrelating the original set of features.

19. A computer program product embodied in a non-transitory computer readable medium and comprising computer instructions for:
  receiving a set of data elements, wherein the set of data elements includes a stream of events;
  for each feature of a set of features, determining a corresponding reference distribution of the respective feature using the set of data elements, wherein the corresponding reference distribution characterizes a distribution of training data in a reference time period of the training data;
  updating a histogram representing the corresponding reference distribution, wherein the update is constant in both time and memory with respect to a number of events in the stream of events contributing to the corresponding reference distribution;
  for each feature of the set of features, determining one or more corresponding subset distributions for one or more subsets sampled from the set of data elements;
  for each feature of the set of features, comparing the corresponding reference distribution with each of the one or more corresponding subset distributions to determine a corresponding distribution of divergences including by computing a divergence measure for each comparison of the corresponding reference distribution with the one or more corresponding subset distributions, wherein the divergence measure indicates a degree of difference between the corresponding reference distribution with the one or more corresponding subset distributions;
  optimizing a memory usage and a computational cost associated with a retraining of a machine learning model including by determining an optimal time for the retraining of the machine learning model based on the degree of difference, wherein one or more features of the set of features are utilized by the machine learning model for predictive tasks; and
  providing at least the determined distributions of divergences for the set of features associated with detection of unusual transactions for use in automated data analysis.

* * * * *